Nov. 21, 1933.  I. H. FREESE  1,935,739
GLASS TAKE-OUT MECHANISM
Original Filed Nov. 29, 1927   5 Sheets-Sheet 1

INVENTOR.
I. H. Freese
BY
ATTORNEYS.

Nov. 21, 1933.　　　　I. H. FREESE　　　　1,935,739
GLASS TAKE-OUT MECHANISM
Original Filed Nov. 29, 1927　　5 Sheets-Sheet 2

Inventor
I. H. Freese
Eccleston & Eccleston
Attorneys

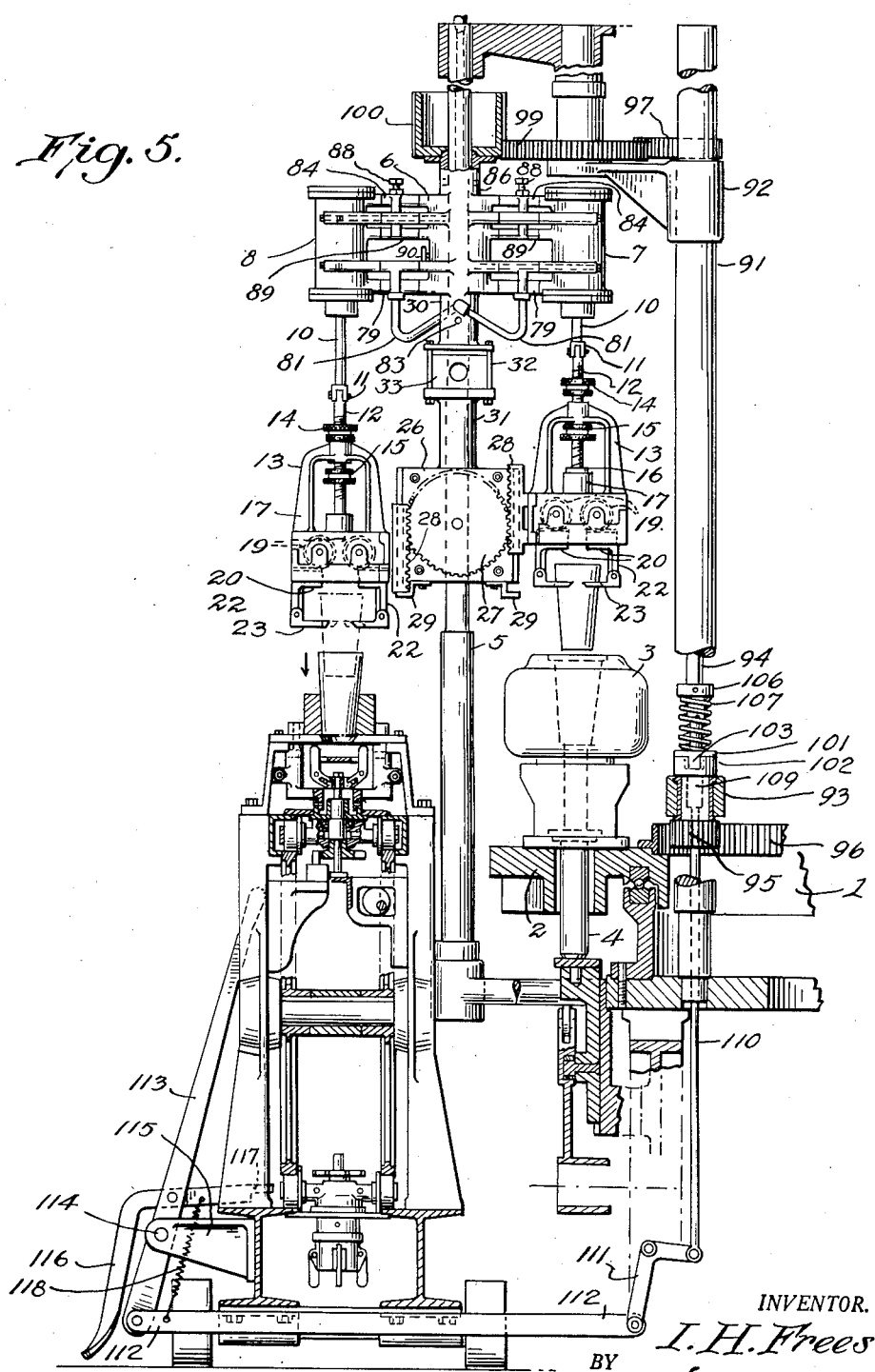

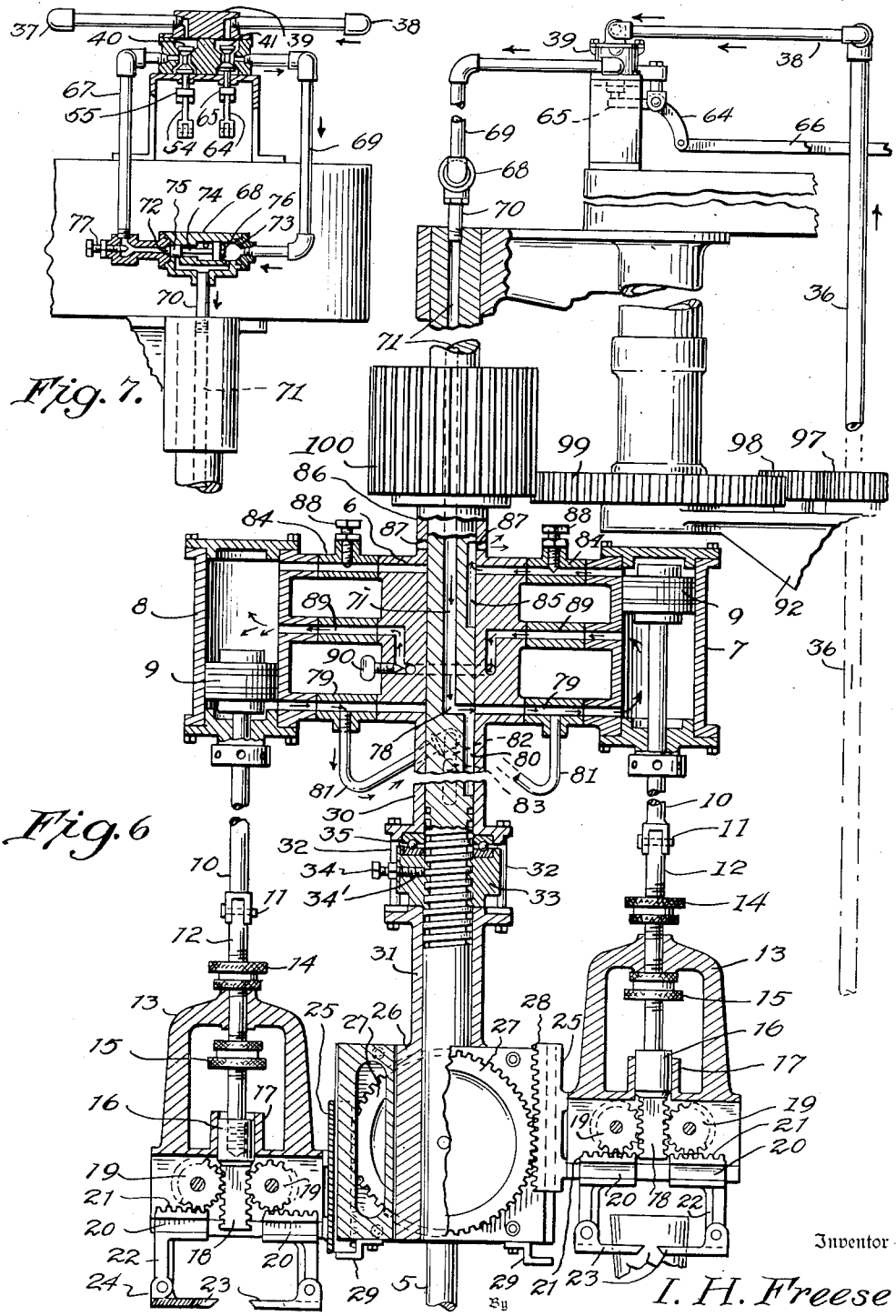

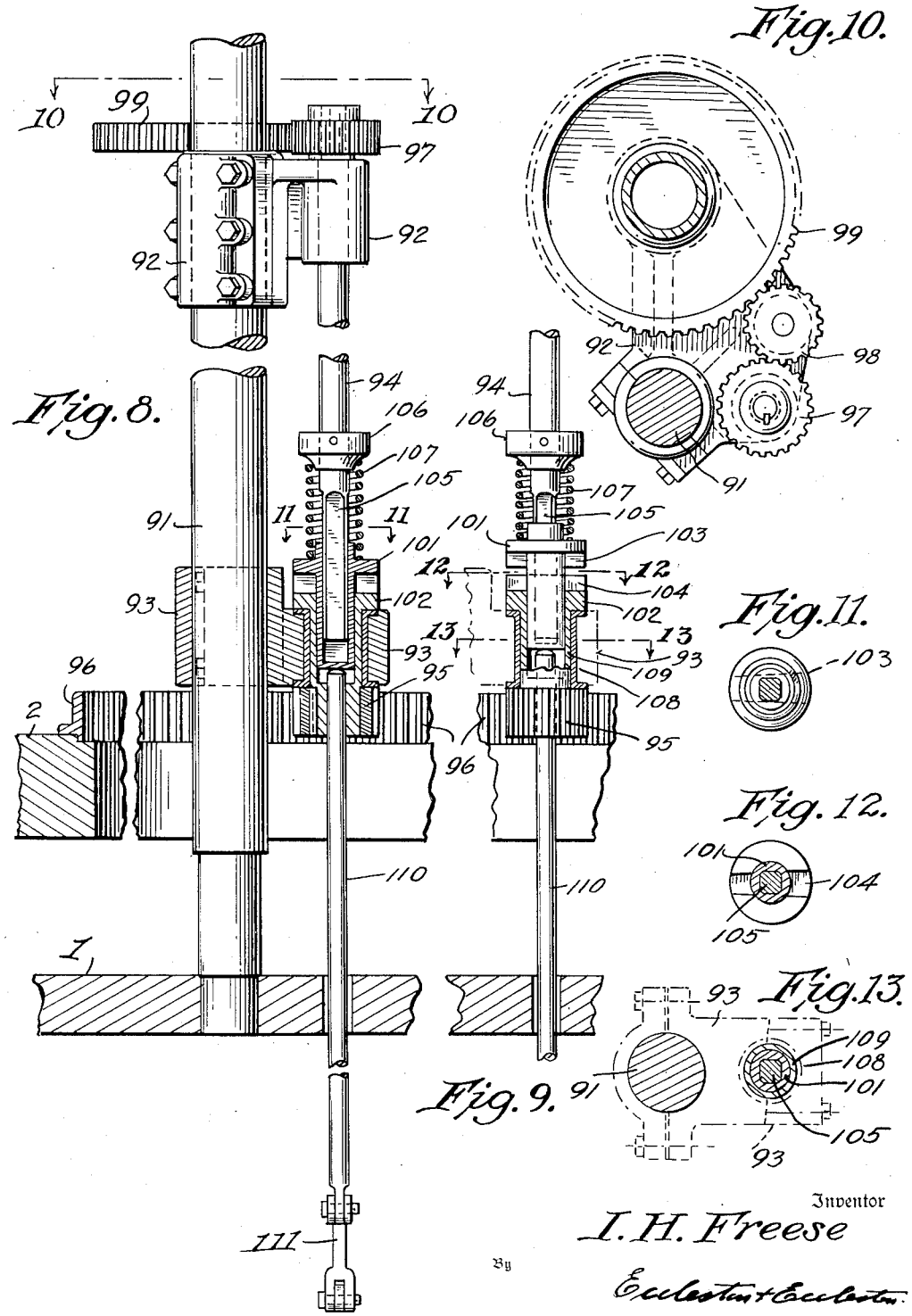

Patented Nov. 21, 1933

1,935,739

UNITED STATES PATENT OFFICE 1,935,739

GLASS TAKE-OUT MECHANISM

Ira H. Freese, Clarksburg, W. Va., assignor to Hazel-Atlas Glass Co., Wheeling, W. Va., a corporation of West Virginia Original application November 29, 1927, Serial No. 236,524. Divided and this application April 28, 1930. Serial No. 448,073

23 Claims. (Cl. 214—1)

The invention relates generally to mechanisms for transferring glassware from a forming machine to a conveyer, such as a continuously moving conveyer of a fire-finisher. The numerous novel features of this invention will appear from the detailed description, and will be defined by the appended claims.

This application is a division of my application Serial No. 236,524, filed November 29, 1927.

Referring to the drawings:

Figure 5 is a vertical transverse sectional view of the receiver and conveyer; the take-out device being shown in elevation, and parts being broken away to more clearly show certain connections with the forming machine.

Figure 6 is a vertical sectional view of the take-out device; the air connections and valves leading thereto, being shown in elevation.

Figure 7 is a vertical sectional view of the valves controlling the operation of the take-out mechanism.

Figure 8 is a detail view of the driving connection between the forming machine and the take-out device, and including a sectional view of the clutch in operative position.

Figure 9 is a detail view of the clutch in inoperative position.

Figure 10 is a horizontal sectional view taken on line 10—10 of Figure 8, and showing a plan of the train of gearing for rotating the take-out device.

Figure 11 is a detail horizontal sectional view taken on line 11—11 of Figure 8.

Figure 12 is a detail horizontal sectional view taken on line 12—12 of Figure 9; and Figure 13 is a detail horizontal sectional view taken on line 13—13 of Figure 9.

Figure 1:
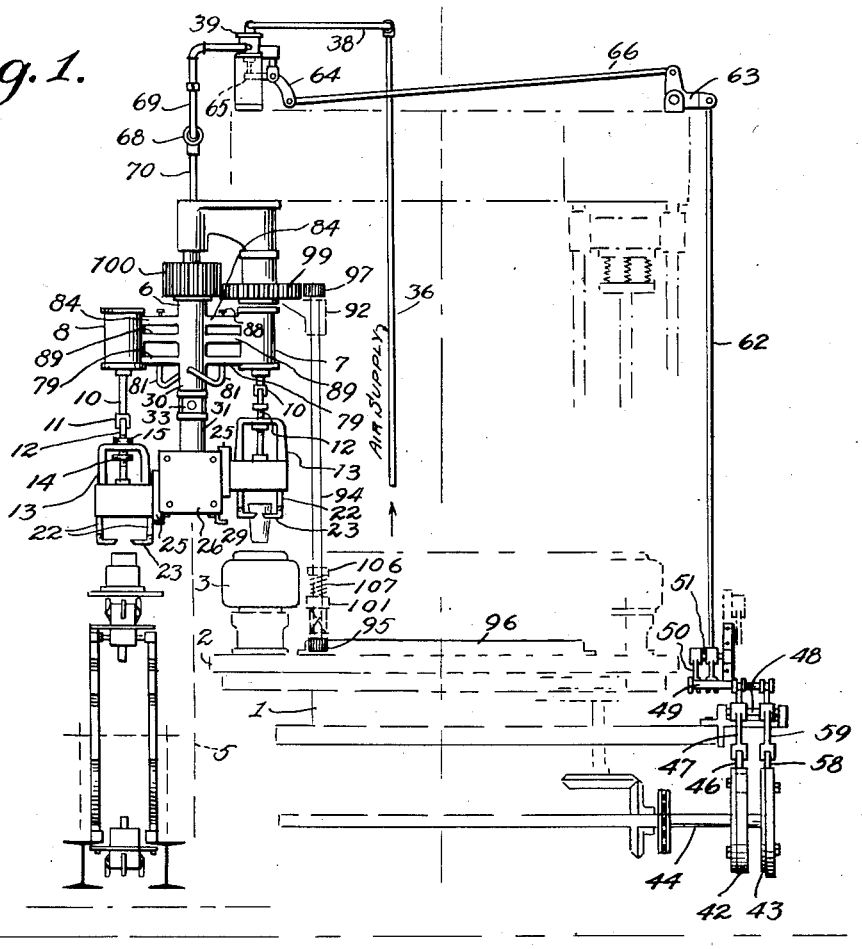
Figure 1 is a front elevational view of the take-out device, and the operating mechanism therefor associated with a forming machine; the forming machine being shown merely in outline.

Numeral 1 indicates generally a forming machine which is shown merely diagrammatically, as the invention is obviously adaptable to any type of forming machine, such as a pressing machine, a blowing machine, or a pressing and blowing machine; and the forming machine may be intermittently rotated, continuously rotated, or of the stationary type. Solely for the puroposes of illustration, I have indicated diagrammatically a simple pressing machine including an intermittently rotated table 2, carrying the desired number of pressing molds 3. In this intermittently rotating pressing machine, which I have chosen for purposes of illustration, and with which this invention is at present employed, the table is rotated step by step by the usual and well known means, to successively move the molds from station to station, at which stations the necessary operations are performed to fabricate the ware. When each mold comes to the take-out station, its elevator 4 is lifted in the usual manner, to move the formed article upwardly into position where the article may be gripped for removal. The particular means shown herein for gripping the ware and transferring it to cups on a continuously moving endless conveyer, will now be described in detail.

Numeral 5 indicates a fixed support or column, which rotatably supports the frame carrying the cylinders which operate the grippers; the frame being indicated generally by numeral 6, and the gripper operating cylinders carried thereby being indicated by numerals 7 and 8. The two cylinders, the air connections therewith, and the mechanism operated thereby, are identical; and consequently it will be sufficient to describe one of these units. By reference particularly to Fig. 6, it will be seen that piston 9 operates the downwardly extending piston rod 10, which is preferably pivotally connected at its lower end, as indicated by numeral 11, to a rod 12. This pivotal connection is for the purpose of facilitating the alignment of various parts and also permits rod 12 and parts associated therewith to be removed, as a unit, for repair without dismantling the entire device. This rod 12 passes on down through a suitable passage provided in the upper end of a frame 13 which carries the grippers. The rod 12 has a sliding lost motion connection with the frame 13 by means of lock nuts 14 and 15 threaded on the rod above and below the frame. It will be understood, of course, that the desired extent of lost motion is obtained by the adjustment of one or the other, or both, of these lock nuts; thereby adjusting the extent of opening and closing movement of the grippers. The rod 12 extends on downwardly and preferably is provided with an enlarged portion 16 slidably mounted in a sleeve 17 on the frame, whereby the rod is guided in its slight reciprocations relative to the frame; and below this enlarged portion 16, the rod carries a rack 18 which extends between and is always in mesh with, two gear wheels 19; the gear wheels being suitably mounted in the lower portion of the frame 13. Slidably mounted on the lower edge of the frame are two shoes 20, and each of these shoes is provided with a rack 21 meshing with one of the gears 19. Each shoe 20 is provided with a downwardly extending shank 22, to which is attached one of the grippers 23. In the preferred construction, illustrated herein, the grippers are pivotally attached to the shanks; and also they are preferably pivotally mounted in such manner that they can be swung upwardly from the normal horizontal position, but cannot swing downwardly below the horizontal position. This is illustrated at the left hand side of Figure 6, which shows the shank 22 provided with a lug 24, which engages the gripper when it reaches a horizontal position and maintains it in that position against further downward swinging movement, but which permits the grippers to swing freely upward. It will be understood that a gripper unit is over the mold at take-out position when the article is lifted in the mold by the usual elevator; and it is therefore apparent that by means of this simple construction, if an article being elevated should strike one or both of the grippers they will simply be momentarily lifted upwardly by the article, without in any way interfering with the proper functioning of the grippers.

As stated hereinbefore, the lock nuts 14, 15, permit a slight reciprocable movement of the rod 12 with respect to the frame 13; and it will be apparent that when the rod 12 first starts to move upwardly, while of course the frame remains stationary, the double racks 18 will cause the rotation of the gears 19, which by engagement with the racks 21 will cause the shoes 20 to approach each other, whereby the grippers 23 will gently but firmly grasp the article to be transferred. Just as the grippers are moved to operative position to grasp the article, the nut 15 will strike the frame 13, so that in the further upward movement of the rod 12, the frame and grippers will be carried along bodily with it, whereby the article is elevated to a position where it is entirely free of the mold.

While the transfer unit over the mold, at the take-out station, is being elevated, the opposite transfer unit is being lowered to deposit a transferred article into a cup of an endless conveyer which is continuously moving, and which will carry the article onward toward a leer, while it is being subjected to the various operations essential to the formation of the finished article. This downward movement of one transfer unit by the upward movement of the opposite transfer unit, is effected by means of a balanced gear arrangement, which will now be described.

Each of the gripper frames carries on its side adjacent the support 5, a shoe 25 which is slidably fitted on a block 26 mounted on the support 5. Rotatably mounted on this block are two gears 27, and each shoe is provided with two racks 28, to mesh with these gears. Thus when one unit moves upwardly, its shoe will move therewith, and the racks carried by the shoe will engage and rotate the gears 27, which by their engagement with the racks carried by the opposite gripper frame, will cause this opposite gripper frame to be lowered, until it is brought to a stop by striking the abutment 29; the grippers still remaining in closed position. The further downward movement of the rod 12, permitted by the lock nuts 14 and 15, opens the grippers, and frees the transferred article. The manner in which this slight further downward movement is accomplished, will appear hereinafter. It will be apparent that in place of the particular balance gear arrangement described above, I may employ various other means for effecting the lowering of one transfer unit by the elevation of the opposite transfer unit.

Before proceeding further with the description it may be mentioned that the frame 6 which carries the gripper operating cylinders, has a downwardly extending sleeve 30, and the block 26 which carries the balance gear unit, has an upwardly extending sleeve 31; the ends of the two sleeves being spaced from each other, but formed into a unitary structure by bolts 32, as clearly shown in Figures 5 and 6. Threadedly mounted on the support 5, between these spaced sleeves 30 and 31, is a nut 33; the nut being held against rotation by means of a set screw 34 and a soft copper plug 34' between the end of the set screw and the threads on the support 5; and there preferably being provided a ball bearing race 35 between the upper face of the nut and the lower face of the sleeve 30. By this construction the cylinder frame, the grippers and the balance gear construction will all rotate freely about the support 5 as a single unit, but by the mere rotation of the nut 33 the whole unit may be raised or lowered to the desired extent, to adapt the device to ware of different height.

The means for operating the cylinders to open and close and to raise and lower the grippers, will now be described; and this will be followed by a description of the means for rotating the grippers from the take-out position to the point of delivery.

Figure 2:
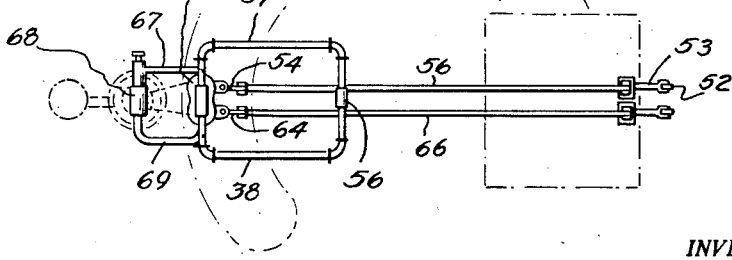
Figure 2 is a detail plan view of the piping for the valves of the take-out mechanism.
Figure 3:
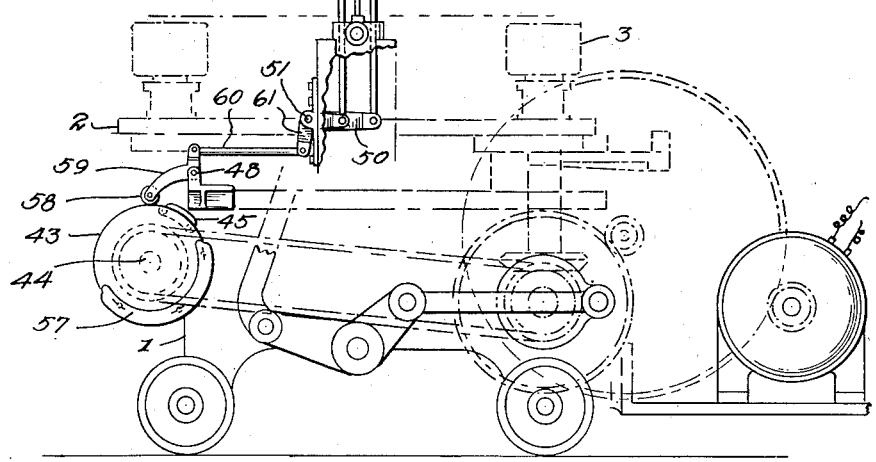
Figure 3 is a side elevational view of the mechanism associated with a forming machine, for operating the valves of the take-out device; the forming machine being shown in outline.
Figure 4:
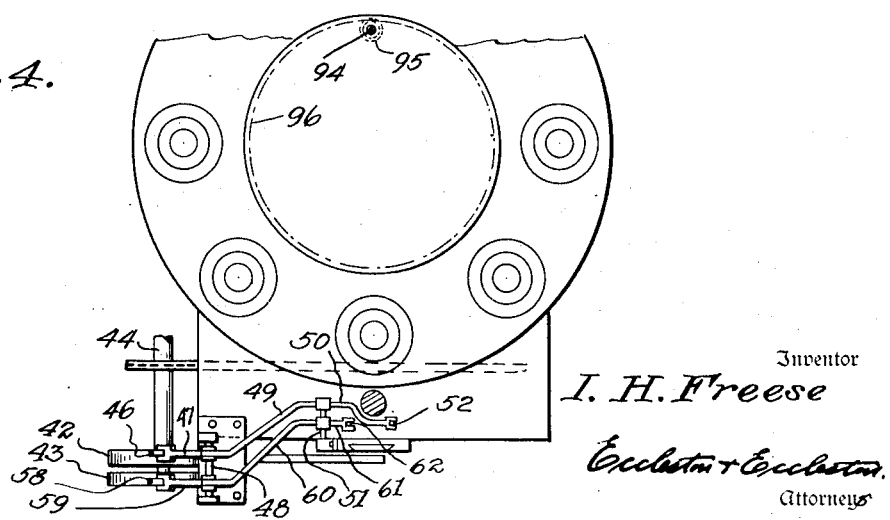
Figure 4 is a plan view of the mechanism associated with a forming machine, for operating the valves of the take-out device; the forming machine being shown in outline.

In the following description of the means for operating the cylinders, it is to be understood that one of the objects sought is to gently close the grippers about the article, and it is for this reason that the air first introduced is at reduced pressure, to close the grippers, and is followed by the introduction of air at full pressure to raise and lower the grippers after they have been closed, as will now be explained. Numeral 36 indicates the main air supply line which leads from any convenient source of compressed air or other motive fluid, and from this main line lead two branch lines 37 and 38, to a valve casing 39, in which casing two valves 40 and 41, are arranged. Reference is to be had particularly to Figures 1 to 7, for a disclosure of the piping, the various valves, the means for operating the valves, the gripper-operating cylinders, and the various passages and valves associated with these cylinders. The valves 40 and 41 are normally maintained seated by reason of the air pressure acting on the upper surface thereof; and are lifted at the desired times and in the desired relation by cams driven by the forming machine. The air valve cams for the take-out device are indicated by numerals 42 and 43, and in the present instance they are mounted on and rotate with the jack shaft 44 of the forming machine or press. The cam 42 has adjustably mounted thereon by any desired means, a relatively short lobe 45, and associated with this cam is a roller 46 carried by one arm of a bell-crank lever 47, pivotally mounted at 48. The other arm of the bell-crank lever 47 is pivotally connected to a horizontally extending rod 49, the opposite end of which rod is pivotally connected to one arm of another bell crank lever 50 which is pivotally mounted at 51; and the other arm of this bell crank lever 50 is pivotally connected to the lower end of a vertically disposed connecting rod 52. At its upper end this connecting rod is pivotally connected to one arm of a bell crank lever 53. Arranged adjacent the valve 40 is a pivotally mounted lever 54 which has a free end 55 projecting beneath the valve stem of valve 40; and the opposite end of this lever is connected by means of a rod 56, with the other arm of bell crank lever 53.

The cam 43 has adjustably mounted thereon by any desired means, a relatively long lobe 57, and associated with this cam is a roller 58 carried by one arm of a bell crank lever 59, pivotally mounted at 48. The other arm of the bell crank lever 59 is pivotally connected to a horizontally extending rod 60, the opposite end of which rod is pivotally connected to one arm of another bell crank lever 61 which is pivotally mounted at 51; and the other arm of this bell crank lever 61 is pivotally connected to the lower end of a vertically disposed connecting rod 62. At its upper end this connecting rod is connected to one arm of a bell crank lever 63. Arranged adjacent the valve 41 is a pivotally mounted lever 64 which has a free end 65 projecting beneath the valve stem of valve 41; and the opposite end of this lever is connected by means of a rod 66, with the other end of the bell crank lever 63.

The jack shaft 44, which carries the cams 42 and 43, is continuously rotating, and during each rotation the lobes 45 and 57 will cause the valves 40 and 41 to be tripped at the desired time and in the desired relation; any desired variation in the timing being effected by the adjustment of the lobes 45 and 57.

Leading from valve 40 is a pipe 67 which leads to one end of a shuttle valve casing 68, and leading from the valve 41 is a pipe 69 which leads to the opposite end of the shuttle valve casing; and a pipe 70 which is connected with either the pipe 67 or the pipe 69, by means of the shuttle valve, leads from the shuttle valve casing and is connected to the upper end of the support 5, which is centrally bored to provide the passage 71. By reference to Figure 7, it will be seen that the shuttle valve casing is provided with a seat 72 associated with the pipe 67, and with a seat 73 associated with the pipe 69. The valve stem 74 carries the valves 75 and 76 at its opposite ends, which are adapted to cooperate alternately with the valve seats 72 and 73 respectively. The pipe 67, adjacent the shuttle valve casing, is provided with an adjustable needle valve 77, by means of which the volume may be controlled to give the correct pressure for imparting the desired initial slow upward movement to the piston, as will be described hereinafter.

As stated above, a pipe 70 leads from the shuttle valve to the passage 71 in the support 5. This passage extends centrally down the support to a point substantially in the plane of the lower ends of the cylinders, and there turns laterally into a short passage 78, which leads through a pipe connection 79 to the lower end of the cylinder 7, Figure 6. Extending downwardly from the lateral passage 78, at the periphery of the support, is a passage 80, which is, in effect, nothing more than an extension of the central passage 71, and is obviously provided for the purpose of taking care of any vertical adjustment of the frame 6 carrying the cylinder; the vertical adjustment of which is accomplished by the nut 33, as described hereinbefore.

Leading from the pipes 79, are exhaust pipes 81, which are connected to ports on the opposite side of sleeve 30. The support 5 is provided with an elongated groove 82, and the sleeve is provided with two exhaust ports 83, adapted to be alternately brought into register with the groove by the rotation of the sleeve and the cylinder frame with which it is connected. It will be understood, of course, that the groove 82 is elongated to take care of the vertical adjustment of the cylinders. By means of the above described construction, the lower end of cylinder 8, Figure 6, is open to exhaust to the atmosphere, through pipes 79 and 81, groove 82 and port 83; while cylinder 7 is not open to exhaust. When the position of the cylinders is reversed, by rotating them through 180°, the cylinder 7 will be open to exhaust through pipes 79 and 81, groove 82, and its own exhaust port 83 which is then in communication with the groove.

Each of the cylinders 7 and 8, is also provided with an exhaust pipe 84 leading from the upper end of the cylinders, and the support 5 has an elongated groove 85 with which these pipes 84 alternately communicate; and the upwardly extending sleeve 86 of the cylinder frame is provided with oppositely disposed exhaust ports 87. Thus when the cylinders are in the position illustrated in Figure 6, the upper end of cylinder 7 is exhausting through pipe 84, groove 85 and its port 87, while exhaust from the upper end of cylinder 8 is shut off; and when the cylinders are rotated through 180°, the upper end of cylinder 8 will exhaust through pipe 84, groove 85, and its port 87, while exhaust from the upper end of cylinder 7 is shut off. The groove 85 is elongated to take care of the vertical adjustment of the cylinders. Each of the exhaust pipes 84 is preferably provided with an adjustable needle valve 88, to control the exhaust, thereby regulating the velocity of the up stroke of the pistons, and also providing a cushion therefor.

A by-pass 89 leads from a point intermediate the ends of cylinder 7 to a point intermediate the ends of cylinder 8, and this by-pass is preferably provided with a needle valve 90 to regulate the volume of fluid passing therethrough, thereby regulating the pressure that is applied above the piston to move it to its lowermost position to separate the grippers. It is to be particularly noted that no means is provided for directly supplying fluid pressure to the upper end of either cylinder; the entire operation being effected by supplying pressure to the lower end of a cylinder while it is at the take-out position, and by-passing it over to the other cylinder to give the final downward movement to the piston of the latter cylinder. The reason for the structure described above will become more apparent in the description of the operation of the cylinders and grippers; but before describing such operation, I shall describe the particular means illustrated herein, for effecting the rotation of the cylinders and grippers.

In the description of the means for rotating the take-out mechanism, reference should be had to Figures 1 and 5 to 10. Numeral 91 indicates a post or standard, and fixed thereto, adjacent the upper end thereof, is a bracket 92; and fixed to the lower portion of the standard, but above the mold table is another bracket 93. A driving shaft is indicated by numeral 94, and the bracket 92 provides an upper bearing for this shaft, and the lower end is associated with a clutch which is carried by the bracket 93. The specific clutch mechanism will be described hereinafter; but it may be mentioned here that the lower clutch member carries a pinion 95 which is in engagement with a circular rack or internal gear 96 fixed to the mold table. Consequently, the shaft 94 is rotated whenever the mold table is rotated. Fixed to the upper end of the shaft 94 is a pinion 97 meshing with an idler gear 98. And the idler meshes with a large gear 99, which in turn drives the gear 100 which is rotatably mounted on the support 5 and which has any suitable driving connection with the upwardly extending sleeve 86 of the cylinder frame unit 6. It will be noted that the gear 100 is elongated to take care of any vertical adjustment of the take-out mechanism.

From the above description it will be apparent that whenever the mold table comes to a stop the rotary movement of the transfer units will cease; and that when the mold table rotates the transfer units will rotate; it being understood, of course, that the gearing ratio, in the present machine, is such that the movement of the mold table for a distance of one step, that is to carry a mold from one station to another, will cause the take-out mechanism to rotate 180°, to carry one of the units from the take-out position to the point of delivery, and to bring the other unit from the point of delivery, to the take-out position. In the present instance I have shown the device as provided with only two transfer units, but it will be apparent that three, four, or more units may be employed; it being only necessary to change the gearing ratio. While I have described the specific train of gearing for rotating the transfer units, it is obvious that the invention contemplates the use of any desired means for intermittently or continuously revolving the units.

In order that the device may be thrown into and out of operation quickly and easily, I have provided the shaft 94 with a clutch, which will now be described. The upper and lower clutch members are indicated by the numerals 101 and 102 respectively; and the face of the upper clutch member is provided with a lug 103, while the face of the lower clutch member is provided with a groove 104; the groove and lug being adapted to interlock when the clutch is thrown in. It will be noted that the upper clutch member is slidably mounted on the lower end of the shaft 94, and that this portion of the shaft is squared, as indicated by numeral 105, to fit a squared opening in the upper clutch member. In other words, the upper clutch member is slidable vertically on the shaft 94 but must rotate therewith. A collar 106 is pinned or otherwise secured to the shaft 94, and a spring 107 is compressed between the lower face of the collar and the upper face of the upper clutch member 101, whereby the upper clutch member is normally pressed downward into engagement with the lower clutch member 102.

Numeral 108 indicates a bushing which rotatably supports the lower clutch member 102, and this clutch member has a downwardly extending sleeve 109, which extends through the bushing and has its lower end attached to the gear 95. As clearly shown in the drawings, the upper clutch member is rotatably and slidably mounted in the sleeve of the lower clutch member, and the lower squared end 105 of the shaft 94 is slidably but non-rotatably mounted in the upper clutch member. Thus it is apparent that when the two clutch members are in engagement the gear 95 will rotate the shaft 94, and through the train of gearing described, the transfer units will be rotated. But when the upper clutch member is elevated, against the pressure of spring 107, the lug 103 of the upper clutch member will be moved out of engagement with the groove 104 of the lower clutch member, so that the gear 95, sleeve 109 and lower clutch member 102 will merely rotate freely, without any effect on the shaft 94. Thus the transfer units are not only rendered inoperative, but also they are entirely disconnected from the mechanism for rotating them, and accordingly the whole transfer unit is freely mounted on the support 5, and may be rotated by hand to any desired angle with respect to the molds, thereby rendering the molds more accessible, and permitting the operation of the forming machine without interference from the take-out mechanism. This, of course, is desirable when warming up the molds, adjusting the molds, etc. When the upper clutch member is released, the spring 107 will force the lug 102 into the groove 104, when the gear 95 has rotated the lower clutch member through the necessary angle to align the lug and groove. In order that the clutch members will always become engaged in the same relationship, I have tapered the groove and lug, as clearly shown in Figures 11 and 12. It is thus apparent that it is possible for the clutch members to resume their operative relation in one relative position only, and consequently, no matter at what angle the transfer units may be when they are inoperative, they will always resume operation in proper relation to the forming machine.

For the purpose of raising and lowering the upper clutch member, I have provided the rod 110, the upper end of which passes through the lower end of the sleeve 109 of the lower clutch member and abuts against the bottom of the sleeve of the upper clutch member. The lower end of the rod 110 is pivotally attached to one arm of a bell crank lever 111, the other arm of the bell crank lever being connected by a link 112 to the lower end of a hand lever 113, which is pivotally mounted at 114 on a bracket 115 carried by the main frame. A foot-operated trigger 116 is pivotally mounted on the lever 113, and is notched at its inner end, as indicated by numeral 117, to engage an edge of the frame when the hand lever 113 is moved to the left (Fig. 5); a coil spring 118 being provided to normally pull the trigger down into position to engage the edge of the frame. It will be understood from the foregoing description, that when the hand lever 113 is moved to the left (Fig. 5) the rod 110 will be elevated to throw out the clutch, in the manner described; and the notch 117 will engage an edge of the frame and maintain the parts in this position. The clutch having been thrown out, the transfer units are no longer connected with the forming machine, and are freely mounted on the support 5, so that they may be swung to any angular position, where they will be out of the way. To throw the clutch in, it is only necessary to depress the free end of the foot trigger 116 to release the notch 117 from the edge of the frame, whereupon the spring 107 will move the upper clutch member downwardly into engagement with the lower clutch member; it being remembered that by reason of the tapered groove 104 it is possible for the clutch members to engage in only one position. The transfer units will thus be again connected with the forming machine, and will rotate in timed relation therewith, in the manner hereinbefore described. It will be understood, of course, that the downward movement of the upper clutch member forces the rod 110 downwardly, and thereby throws the hand lever 113 to the right, that is, to the position in which it is shown in Figure 5.

A complete cycle of operation of the take-out mechanism will now be described. Reference is to be had particularly to Figure 6, and for the purpose of this description it will be assumed that the position of the pistons is reversed; that is, the piston of cylinder 7 will be at its lower-most position, so that this transfer unit will be down and the grippers open, while the piston of cylinder 8 will be at its uppermost position, so that its transfer unit will be elevated, with the grippers closed.

The transfer unit at the right of Figure 6 has been rotated to a position where it is over a mold at the delivery station. The elevator will now operate in the usual manner to elevate the tumbler or other article in the mold, thereby moving it to a position between the grippers, which, of course, are open. At this stage, the lobe 45 will trip the valve 40 and permit fluid pressure to pass through the shuttle valve to the passage 71. The volume of this fluid is regulated by the valve 77, the purpose of which is to considerably reduce the pressure of the fluid. This fluid at reduced pressure will pass through the passage 71 and pipe 79 to the lower end of cylinder 7. The pressure of the fluid is sufficient to lift the piston to close the grippers, but is not sufficient to lift the transfer unit. Consequently, when this low pressure fluid enters the lower end of cylinder 7 the piston will be given a slight and gentle upward movement, thereby lifting the rod 12, so that the rack 18 will rotate the gears 19 which by engagement with the racks 21 will move the grippers 23 inward to firmly but gently grip the tumbler or other article to be transferred. At this point the nut 15 strikes the undeside of the frame 13 and thereby prevents further inward movement of the grippers; and further upward movement of the rod 12 will bodily lift the transfer unit. As stated hereinbefore the pressure of the fluid originally admitted to the lower end of cylinder 7 is not sufficient to bodily lift the transfer unit; and accordingly at this stage the lobe 57 will open the valve 41, the valve 40 having been closed in the meantime, and fluid at full pressure will thus pass through the shuttle valve to passage 71, and thence through pipe 79 to the lower end of cylinder 7. The piston of cylinder 7 is thus moved rapidly to the upper limit of its stroke thereby bodily lifting the transfer unit and carrying the gripped article to a position clear of the mold. During this upward movement of the piston the fluid pressure in the upper end of the cylinder 7 exhausted through pipe 84, passage 85 and port 87; the exhaust being regulated by the valve 88, which controls the speed of the upward movement of the piston, and also gives a cushioning effect to the piston. The transfer unit is now in the position shown at the right of Figure 6.

The upward movement of the transfer unit at the right of Figure 6, caused the downward movement of the transfer unit on the left, by reason of shoes 25, racks 28 and gears 27; the downward movement being limited by the lug 29. But this downward movement of the transfer unit does not open the grippers to release the article. To accomplish this function, there must be a slight downward movement of the piston in cylinder 8, to move the rod 12 downward relative to the transfer unit; which relative downward movement is permitted by reason of the lost motion connection consisting of the nuts 14 and 15 arranged respectively above and below the frame 13. To accomplish this slight downward movement of the piston to release the article carried by the transfer unit on the left of Figure 6, I provide a pipe 89 which communicates with the cylinders 7 and 8 at a point about midway of this length; the inner ends of the pipe 89 being in communication through a suitable passage, in which passage there is a needle valve 90, to control the volume of the fluid. Thus when the piston of cylinder 7 approaches the upper end of its stroke, it will free the port leading to pipe 89, and the fluid beneath this piston will pass through pipe 89 and enter cylinder 8 above the piston; the pressure on the piston being controlled by the valve 90. This fluid pressure will move the piston downward, thereby moving the rod 12 downward until the nut 14 abuts against the upper face of the frame member 13. This downward movement of the rod 12 will, by reason of rack 18, gears 19, and racks 21, cause the grippers to be moved apart to release the transferred article. During the down stroke of the piston in cylinder 8, the fluid pressure beneath the piston exhausted through pipes 79, 81, passage 82 and port 83. All of the parts are now in the position shown in Figure 6. In the right hand transfer unit the grippers have been closed to grip the article, and the unit has been lifted bodily to lift the article clear of the mold; while in the left hand transfer unit, the unit has been lowered bodily, and the grippers have been separated to release the article. The take-out mechanism is now ready to be rotated. At this stage the mold table will resume its step-by-step rotation, to carry the empty mold away, and to bring another mold to the delivery station to discharge the formed article therein. This rotation of the mold table will, through the train of gearing already described, cause the transfer frame to rotate through 180°, thereby reversing the position of the cylinders and transfer units. Thus a complete cycle of operation has been performed, and the operation is ready to be started over again by tripping valve 40 to admit low pressure air to the lower end of cylinder 8 (which is now above the mold) to close the grippers; the entire operation being repeated in the manner above described. It is to be noted that while I prefer to employ low pressure fluid to operate the grippers, thereby giving a more gentle closing movement; yet this is not essential to the successful operation of the take-out mechanism, and the means for accomplishing this desirable function may be omitted without in any manner departing from the invention disclosed herein.

The timing of the valves may be adjusted by adjusting the lobes 45 and 57, or by any other desired means; the volume of air for closing the grippers may be regulated by the valve 77; the volume of air for opening the grippers may be regulated by the valve 90; the entire mechanism may be raised or lowered, for ware of different height, by the rotation of the nut 33; the extent of opening and closing of the grippers may be regulated by the nuts 14 and 15, for ware of different breadth; and to avoid any possible jamming between the grippers and the ware, I pivotally mount the grippers so that they may freely swing upwardly, but cannot swing downwardly below a substantially horizontal position.

While I have described this take-out mechanism in its particular relation to a forming machine, yet it is to be understood that the mechanism is of general application and may be employed wherever it is desirable to transfer ware from one to another position. When the take-out mechanism is used for delivering ware to a fire-finisher, it may deliver the ware directly to the conveyer of the fire-finisher, or a receiver mechanism may be interposed between the conveyer and the delivery point of the take-out mechanism. The receiver is neither described nor claimed herein, as it constitutes the subject-matter of a separate application, Ser. No. 600,539, filed March 22, 1932, which application is a division of the present application and of an application Ser. No. 236,524, filed November 29, 1927.

Obviously many changes and modifications may be made without departing from the spirit of the invention; and all such changes and modifications are intended to be included within the scope of the appended claims.

What I claim is:

1. A take-out mechanism for glassware, including a plurality of gripping units revolvable about a vertical axis, a cylinder associated with each unit, and means for closing one set of grippers and opening another set of grippers by the admission of fluid pressure directly to one cylinder only.

2. A take-out mechanism for glassware, including a plurality of gripping units, fluid pressure operated means for lifting one unit, a mechanical connection between the units whereby another unit is simultaneously lowered, and fluid pressure operated means for opening the grippers of the unit in lowered position.

3. A take-out mechanism for glassware including a vertically movable frame, a pair of grippers slidably mounted on said frame, a rack carried by each gripper, two gears, each of said gears meshing with one of said racks, and a vertically movable rack engaging both of said gears.

4. A take-out mechanism for glassware including a frame, grippers slidably mounted on said frame for movement in substantially a horizontal plane, a rod associated with said frame, means carried by said rod for opening and closing the grippers, nuts adjustably mounted on said rod above and below said frame to provide a lost motion connection therewith, and means for lifting said rod to close the grippers and further lifting said rod to bodily lift the frame and associated parts.

5. A take-out mechanism for glassware including a frame, shoes slidably mounted on said frame, grippers carried by said shoes, a rack provided on each of said shoes, gears meshing with said racks, a vertically extending rod associated with said frame, a rack carried by said rod and meshing with said gears, nuts adjustably mounted on said rod above and below the frame to provide a lost motion connection, and a cylinder and piston for operating said rod.

6. A take-out mechanism for glassware including a plurality of cylinders revolvable in a horizontal plane about a common axis, a gripper unit operated by each of said cylinders, means for supplying low pressure fluid to one cylinder to close the grippers of one unit, and means for supplying high pressure fluid to one cylinder for bodily elevating one of said units.

7. A take-out mechanism for glassware including a plurality of cylinders revolvable in a horizontal plane about a common axis, a gripper unit operated by each of said cylinders, means for supplying low pressure fluid to one cylinder to close the grippers of one unit, means for supplying high pressure fluid to one cylinder for bodily elevating one of said units, and a mechanical connection between two of said units, whereby when one unit is bodily raised the other unit is bodily lowered.

8. A take-out mechanism for glassware including a plurality of cylinders revolvable in a horizontal plane about a common axis, a gripper unit operated by each cylinder, means for bringing each cylinder successively into position over a mold, and interconnecting parts between the cylinders and gripper units causing fluid pressure admitted directly to only one end of one cylinder to close the grippers of one unit, elevate the same unit and lower another unit, and open the grippers of the latter unit.

9. A take-out mechanism for glassware including a plurality of cylinders revolvable in a horizontal plane about a common axis, a gripper unit operated by each cylinder, and a by-pass for fluid from below the piston in one cylinder to a point above the piston in another cylinder, for the purpose described.

10. A take-out mechanism for glassware including a plurality of cylinders revolvable in a horizontal plane about a common axis, a gripper unit operated by each cylinder, means for admitting fluid pressure to the end of one cylinder to bodily elevate a gripper unit, and means for by-passing the fluid to another cylinder for opening the grippers of a unit.

11. A take-out mechanism for glassware including a plurality of cylinders revolvable in a horizontal plane about a common axis, a gripper unit operated by each cylinder, means for admitting fluid pressure to the end of one cylinder to bodily elevate one of the gripper units, means for by-passing the fluid to another cylinder for opening the grippers of one of the units, and means for regulating the volume of the by-pass fluid.

12. A take-out mechanism for glassware including a vertical post, a frame rotatably mounted on the post, a pair of cylinders carried by the frame on opposite sides of the post, a gripper unit associated with each cylinder, said post provided with a passage for fluid pressure, and said post provided with a port whereby fluid pressure in said passage is admitted to one end of each cylinder as each cylinder comes successively to take-out position.

13. A take-out mechanism for glassware including a vertical post, a frame rotatably mounted on the post, a plurality of cylinders carried by the frame, a gripper unit associated with each cylinder, said post provided with a passage for fluid pressure, the lower end of each cylinder adapted to communicate with said passage at the take-out position, said post also having an exhaust passage, and the upper end of each cylinder adapted to communicate with the exhaust passage at the take-out position.

14. A take-out mechanism for glassware including a vertical post, a frame rotatably mounted on the post, a plurality of cylinders carried by the frame, a gripper unit associated with each cylinder, said post provided with a passage for fluid pressure, the lower end of each cylinder adapted to communicate with said passage at the take-out position, said post also having an exhaust passage, the upper end of each cylinder adapted to communicate with the exhaust passage at the take-out position, a by-pass leading from a point intermediate the ends of one cylinder to a point intermediate the ends of another cylinder, and a volume control valve in said by-pass.

15. A take-out mechanism for glassware including a cylinder, a gripper unit operated by said cylinder, a pair of valves, adjustable means for tripping the valves in the desired timed relation, a shuttle valve, said first-mentioned valves adapted to control the admission of fluid pressure to opposite ends of said shuttle valve, a volume control valve in the line leading from one of the first-mentioned valves to the shuttle valve, the fluid pressure from opposite ends of the shuttle valve being successively admitted to one end of the gripper unit operating cylinders.

16. A take-out mechanism for glassware including a plurality of cylinders mounted to rotate in a horizontal plane about a common axis, a gripper unit associated with each cylinder, and automatic means for successively admitting fluid at different pressures to the lower end of each cylinder at the take-out position.

17. A take-out mechanism including a pair of gripper units, a pair of grippers carried by each unit, a vertical rack carried by each unit, and a gear wheel arranged between and engaging both racks, whereby the vertical movement of one unit in one direction causes the vertical movement of the other unit in the opposite direction.

18. A take-out mechanism for glassware including a post, a frame rotatably mounted on said post, a pair of cylinders carried by the frame, a gripper unit operatively connected with each cylinder, a gear wheel mounted on said post and rotatable thereabout with said frame, and a rack carried by each of said units and meshing with said gear wheel.

19. A take-out mechanism including a plurality of gripper units revolvable in a horizontal plane about a common axis, a pinion driven by a forming machine, a lower clutch member fixed to said pinion, an upper clutch member slidably mounted in the lower clutch member, a shaft, said upper clutch member being slidably mounted on but rotatable with said shaft, a driving connection between the shaft and the gripper units, and means for raising the upper clutch member to permit free rotation of the gripper units by hand.

20. A take-out mechanism for glassware including a pair of gripper units adapted to revolve in a horizontal plane about a common axis, means for closing the grippers of one unit and elevating that unit at the point of take-out, means for lowering the other unit and opening the grippers at the point of delivery, and means to revolve the units to bring the unit in lowered position and with grippers open from the point of delivery to the point of take-out.

21. A take-out mechanism for glassware including a pair of gripper units adapted to revolve in a horizontal plane about a common axis, each unit including two members relatively movable vertically, one of said members carrying the grippers, the other of said members carrying means for closing the grippers, said members being movable vertically relatively to close the grippers and movable vertically together to lift the grippers.

22. A take-out mechanism for glassware including a pair of gripper units adapted to revolve in a horizontal plane about a common axis, each unit including two members relatively movable vertically, one of said members carrying the grippers, means carried by the other of said members for closing the grippers upon relative vertical movement between the members, the second-mentioned member thereafter engaging the first-mentioned member and causing both members to move vertically together to lift the grippers.

23. A take-out mechanism for glassware including a gripper unit adapted to revolve in a horizontal plane about a vertical axis, said unit including two members relatively movable vertically, one of said members carrying the grippers, means carried by the other of said members for closing the grippers upon relative vertical movement between the members, the second-mentioned member thereafter engaging the first-mentioned member and causing both members to move vertically together to lift the grippers.

IRA H. FREESE.